(12) United States Patent
Arnold

(10) Patent No.: US 6,334,278 B1
(45) Date of Patent: Jan. 1, 2002

(54) TORNADO SAFE ROOM

(75) Inventor: Floyd C. Arnold, Port Orange, FL (US)

(73) Assignee: Steelco Incorprorated, Daytona Beach, FL (US)

( * ) Notice: Subject to any disclaimer, the term of this patent is extended or adjusted under 35 U.S.C. 154(b) by 0 days.

(21) Appl. No.: 09/561,436

(22) Filed: Apr. 28, 2000

Related U.S. Application Data

(63) Continuation-in-part of application No. 09/395,334, filed on Sep. 13, 1999, now abandoned.

(51) Int. Cl.⁷ .................................................. E04H 9/14
(52) U.S. Cl. ........................... 52/79.1; 52/79.5; 70/104; 49/394; 109/1 S; 109/59 R
(58) Field of Search ................................. 52/79.1, 79.5, 52/143; 70/101, 104, 128, 181; 49/160, 180, 356, 394; 109/1 S, 59 R

(56) References Cited

U.S. PATENT DOCUMENTS

| | | | | |
|---|---|---|---|---|
| 4,787,181 A | * | 11/1988 | Witten | 52/79.1 |
| 5,848,500 A | * | 12/1998 | Kirk | 52/79.1 |
| 6,003,271 A | | 12/1999 | Boyer et al. | 52/79.5 |

* cited by examiner

Primary Examiner—Laura A. Callo

(74) Attorney, Agent, or Firm—Brian S. Steinberger; Law Offices of Brian S. Steinberger

(57) ABSTRACT

A relocateable shelter for protecting individuals from dangerous conditions such as Tornadoes and the like, that can withstand winds of approximately 450 mph. The shelter can be attached and detached from a concrete foundation. A rectangular frame that is formed from L-shaped longitudinal members are fastened together and can be anchored to the concrete foundation by hook ended anchor bolts that have exposed threaded ends that nuts can attach thereto. Removable panels can be attached to the outside of the frame to form walls and a roof using fasteners such as screws and bolts. A door can be attached to an opening in the side of the frame, and include L-shaped members that form door braces and hinge guards that allow the door to stay in a stationary closed position. Slideable latching members can further hold the door in a locked position. The latching members can be accessible from outside the shelter to open the door and also be accessible from inside the shelter to open the door. The latching members can include outside handle ends, longitudinal bar portions and tip ends that slide in and out of mateable openings in the side edge of the free-end of the door. The entire structure can be easily assembled and disassembled with ease. The shelter can be formed from strong suitable materials such as ¼ inch carbon steel plates, and be able to withstand storm conditions. The shelter is sized large enough to allow plural persons to stand inside. The novel shelter size can be used inside a garage, carport, and the like, where there is still ample place between vehicles stored in the garage and the shelter.

15 Claims, 8 Drawing Sheets

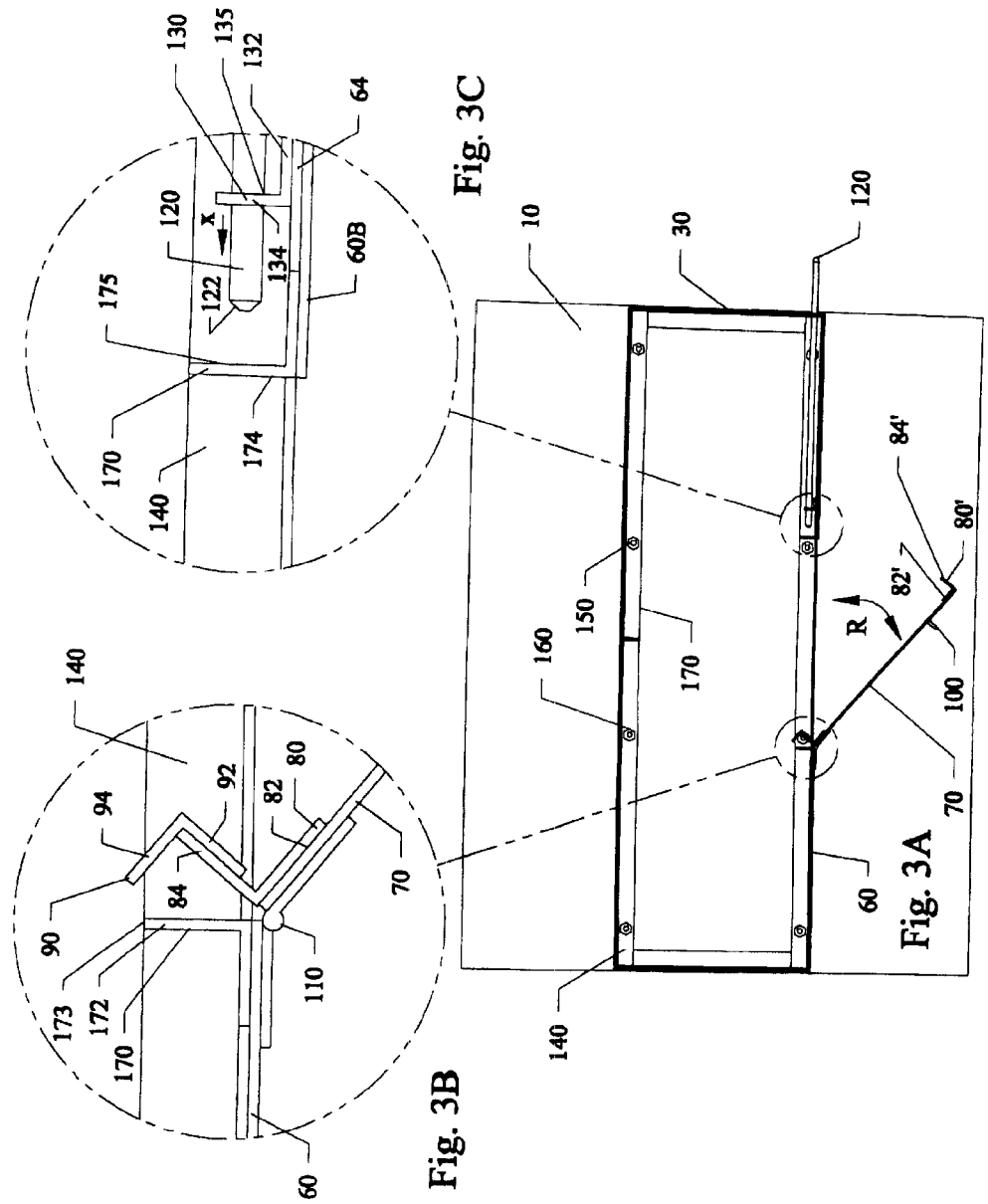

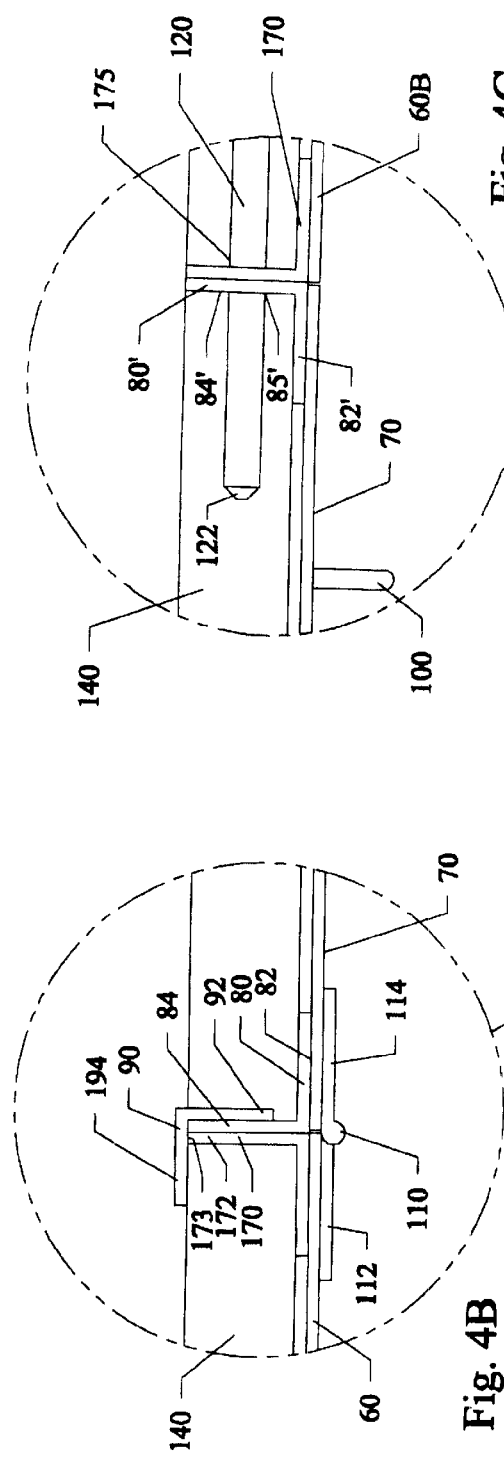

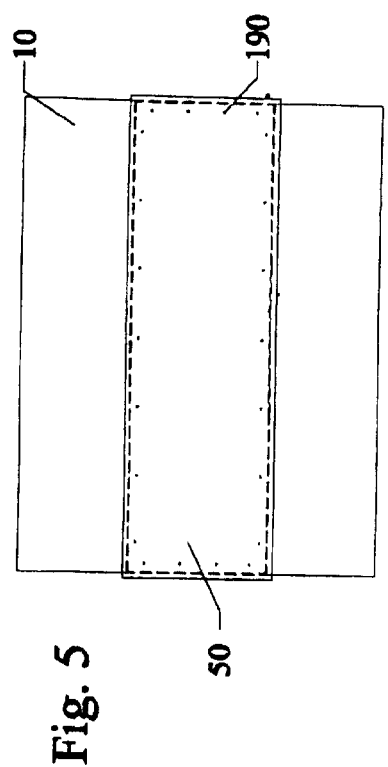
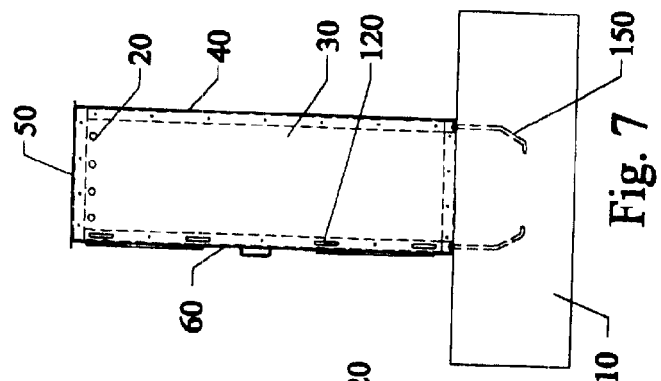
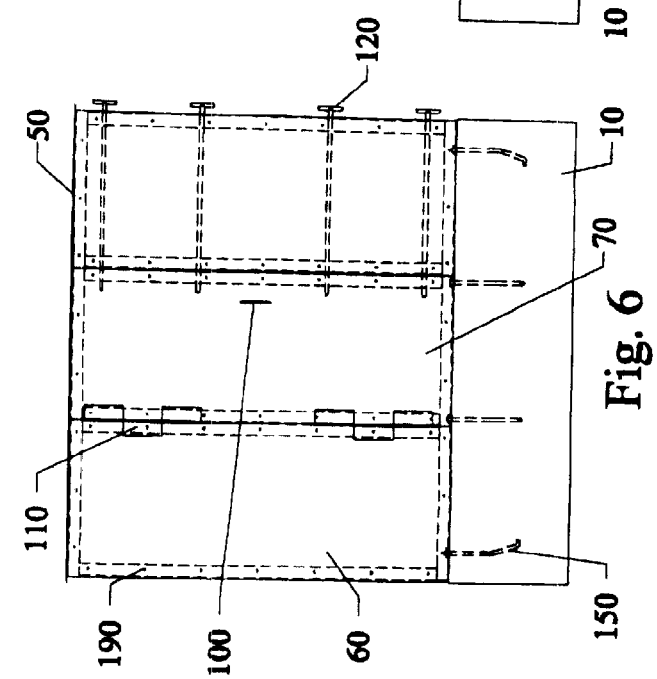
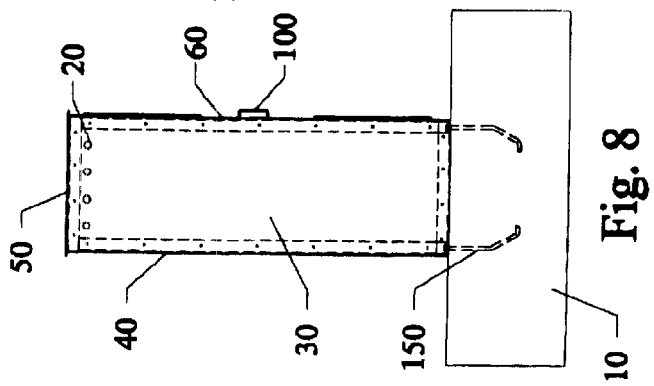

TORNADO SAFE ROOM

This invention relates to buildings, and in particular to a shelter that can be site assembled from matching parts, and be able to be disassembled and relocated to different locations with ease. This invention is a Continuation-In-Part Of U.S. patent application Ser. No. 09/395,334 filed Sep. 13, 1999 now abandoned.

BACKGROUND AND PRIOR ART

For dangerous storms such as tornadoes, safe emergency shelters are needed to protect persons and property from harm and destruction. Tornadoes are normally seasonal with the months of March through June being the most active. Approximately twenty percent of all tornadoes occur during the months of July through October, and less than ten percent occur during November through January. Tornadoes have been recorded with wind speeds of over 300 mph and can stay on the ground for over one hour. Flying debris can cause much injury and destruction. In recent years, more than 1,000 twisters have killed in excess of one hundred twenty people and caused millions of dollars in property damage in the United States. The dollar figure for the damage caused by tornadoes which have struck Oklahoma City, Okla. in May, 1999 alone has exceeded more than 90 million dollars. Regardless of catastrophic damages that occur from tornadoes, hurricanes, and other hazards, relatively little protection against them is provided because of variously prohibitive problems with present protection alternatives. Thus, there exists a need for emergency shelters.

When tornado type warnings are issued, there is usually very little time for individuals and families to go to community shelters. Also many community shelters do not allow for pets.

The National Tornado Forum has announced an effort to encourage more people to build "safe rooms"(emergency shelters). The Federal Emergency Management Agency (FEMA) and the Federal National Mortgage Association (Fannie Mae) have programs and financing in place the encourage people to put their families in "safe rooms" (shelters). The average family moves approximately every seven years. Thus, reusable shelters would be desirable.

A variety of emergency shelters previously have been pre-manufactured for field uses constructed of cement, steel, fiberglass and other materials. Others have been manufactured in an assembled condition for particular applications. None of these prior art shelters can be site-assembled from matching parts and possess the ability of being moveable or relocateable to another address, should the owner decide to relocate, as this invention.

U.S. Pat. No. 6,003,271 to Boyer et al. describes a pre-case security vault device that includes components that can be transported to a construction site. However, this device includes the assembly of permanently affixing the components together such as by using permanent fasteners such as "welds", and the pouring of "concrete" for floors, and the like, and nonremovable fill such as "grout" at the site, column 1, lines 37–38, column 2, lines 66+, column 3, lines 1–10, 12–25, 60–65, column 4, lines 2–4, 37–43. No where does Boyer et al. describe, nor suggest being able to easily disassemble the vault to be able to be relocated at subsequent sites. Additionally, no description, nor suggestion is given in the Boyer "vault" for ventilation purposes to allow humans to be sheltered therein. While Boyer mentions that it may be desirable in the background section of the patent to "protect property from damage or theft or to serve as a shelter . . . ", column 1, lines 4–7, the Boyer "vault" device requires that there construction forms a "vapor-tight enclosure . . . and . . . preventing water from seeping into the vault to damage the property in the vault", column 3, lines 14–18. Thus, Boyer is primarily used for protecting property and not as a "shelter" for people.

SUMMARY OF THE INVENTION

The first objective of the present invention is to provide an easily assembled and relocateable shelter for protecting persons from dangerous conditions such as storms that can be produced at a minimal cost to merit its need.

The second objective of the present invention is to provide an easily assembled and relocateable shelter for protecting persons from dangerous conditions such as storms that can be made from a variety of materials such as carbon steel, stainless steel, aluminum, and the like.

The third objective of the present invention is to provide an easily assembled and relocateable shelter for protecting persons from dangerous conditions such as storms that can be structured for protection against a wide selection of hazards;

The fourth objective of the present invention is to provide an easily assembled and relocateable shelter for protecting persons from dangerous conditions such as storms that can be marketed either assembled or unassembled.

The fifth objective of the present invention is to provide an easily assembled and relocateable shelter for protecting persons from dangerous conditions such as storms that can be packaged for low-bulk, inexpensive and convenient transport.

The sixth objective of the present invention is to provide an easily assembled and relocateable shelter for protecting persons from dangerous conditions such as storms that can be assembled by inexperienced persons.

The seventh objective of the present invention is to provide an easily assembled and relocateable shelter for protecting persons from dangerous conditions such as storms that can be made in sizes to meet different use requirements.

The eighth objective of the present invention is to provide an easily assembled and relocateable shelter for protecting persons from dangerous conditions such as storms that can be used for storage of food and water to meet disaster needs.

The ninth objective of the present invention is to provide an easily assembled and relocateable shelter for protecting persons from dangerous conditions such as storms that can be disassembled and transported to new location should the owner move.

The tenth objective of the present invention is to provide an easily assembled and relocateable shelter for protecting persons from dangerous conditions such as storms that can be tested and certified to withstand hazards.

The eleventh objective of the present invention is to provide an easily assembled and relocateable shelter for protecting persons from dangerous conditions such as storms that can be used as an annex to a building.

The twelfth objective of the present invention is to provide an easily assembled and relocateable shelter for protecting persons from dangerous conditions such as storms that can be positioned inside of a garage/carport and have plenty of room between the shelter vehicle(s) stored inside the garage/carport.

A preferred embodiment of the relocateable shelter includes a rectangular frame formed from longitudinal L-shaped members that can be fastened and unfastened together, panels that can be attached and detached about the frame to form walls and a roof to the frame, and a door that can be attached to one of the walls of the frame for allowing access to an interior of the frame, wherein the frame, panels and door form a shelter allowing persons to seek safety within the shelter. The shelter can be attached to a rectangular concrete foundation beneath the shelter. The shelter can have dimensions of approximately 94 inches long, by approximately 27.5 inches wide by approximately 80 inches in height, and be formed from suitable strong materials such as ¼ inch carbon steel plates. The door can be attached to the shelter by a hinge having a step shaped hinge guard for bracing the door to a closed position adjacent to the hinge. Up to four or more slideable latches can be used to lock the door, where the latches can be accessible to both outside and inside of the shelter to open the door from a closed position. The latches can each include an elongated bar that having one end that slides inside of the shelter to lock the door, and have an outer end having a handle for allowing the door to be opened from outside of the shelter.

The latches can further include a bracket on an inside wall of the shelter for guiding the bar, and a slot in the side of the door for allowing the one end of the bar to pass therethrough so that the door is put into a locked position.

This invention makes it possible for a person, family or other group to have a place of security readily available on the interior of structures with concrete floors such as garages and carports or just outside the door of manufacture homes and mobile homes.

Further objects and advantages of this invention will be apparent from the following detailed description of a presently preferred embodiment which is illustrated schematically in the accompanying drawings.

BRIEF DESCRIPTION OF THE FIGURES

FIG. 3A is a cross-sectional view of the shelter of FIG. 2 along arrow BB.

FIG. 3B is an enlarged view of a door hinge and jam of FIG. 3A.

FIG. 3C is an enlarged view of the safe-T handle of FIG. 3A.

FIG. 4A is a cross-sectional view of the shelter of FIG. 1 along arrow AA.

FIG. 4B is an enlarged view of the door hinge and jam of FIG. 4A.

FIG. 4C is an enlarged view of the safe-T handle of FIG. 4A.

FIG. 5 is a top view of the shelter of FIG. 1 along arrow C1.

FIG. 6 is a front view of the shelter of FIG. 1.

FIG. 7 is a side view of the shelter of FIG. 1 along arrow C2.

FIG. 8 is another side view of the shelter of FIG. 1 along arrow C3.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

This shelter invention 1 depicted in the figures has been tested and certified to withstand 450 miles per hour winds, by Certified Testing Laboratory, 7252 Narcoossee Road, Orlando, Fla., 32822, an independent, Miami, Dade County approved testing laboratory.

Figure 1:
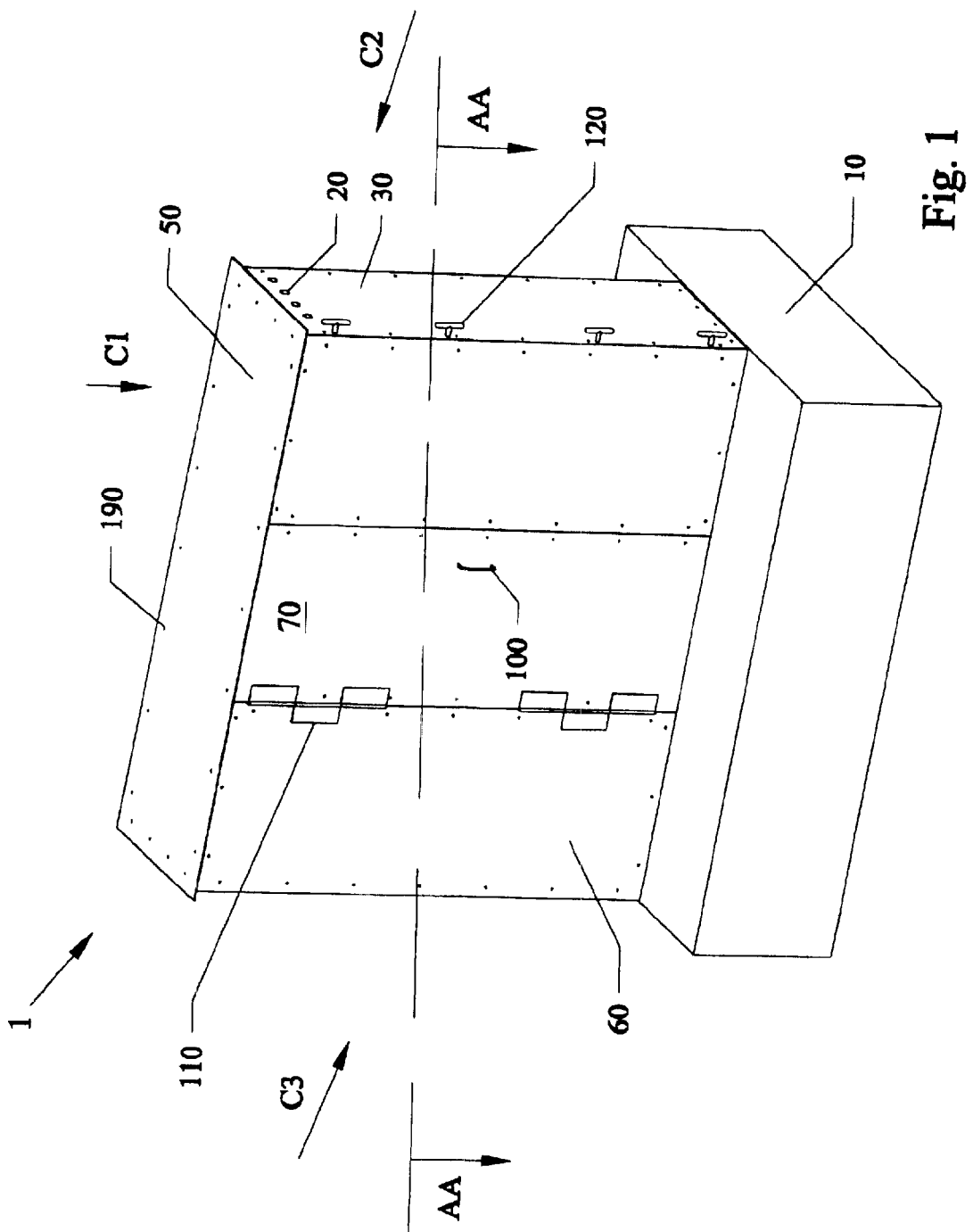
FIG. 1 is a perspective view of the relocateable shelter invention.
Figure 2:
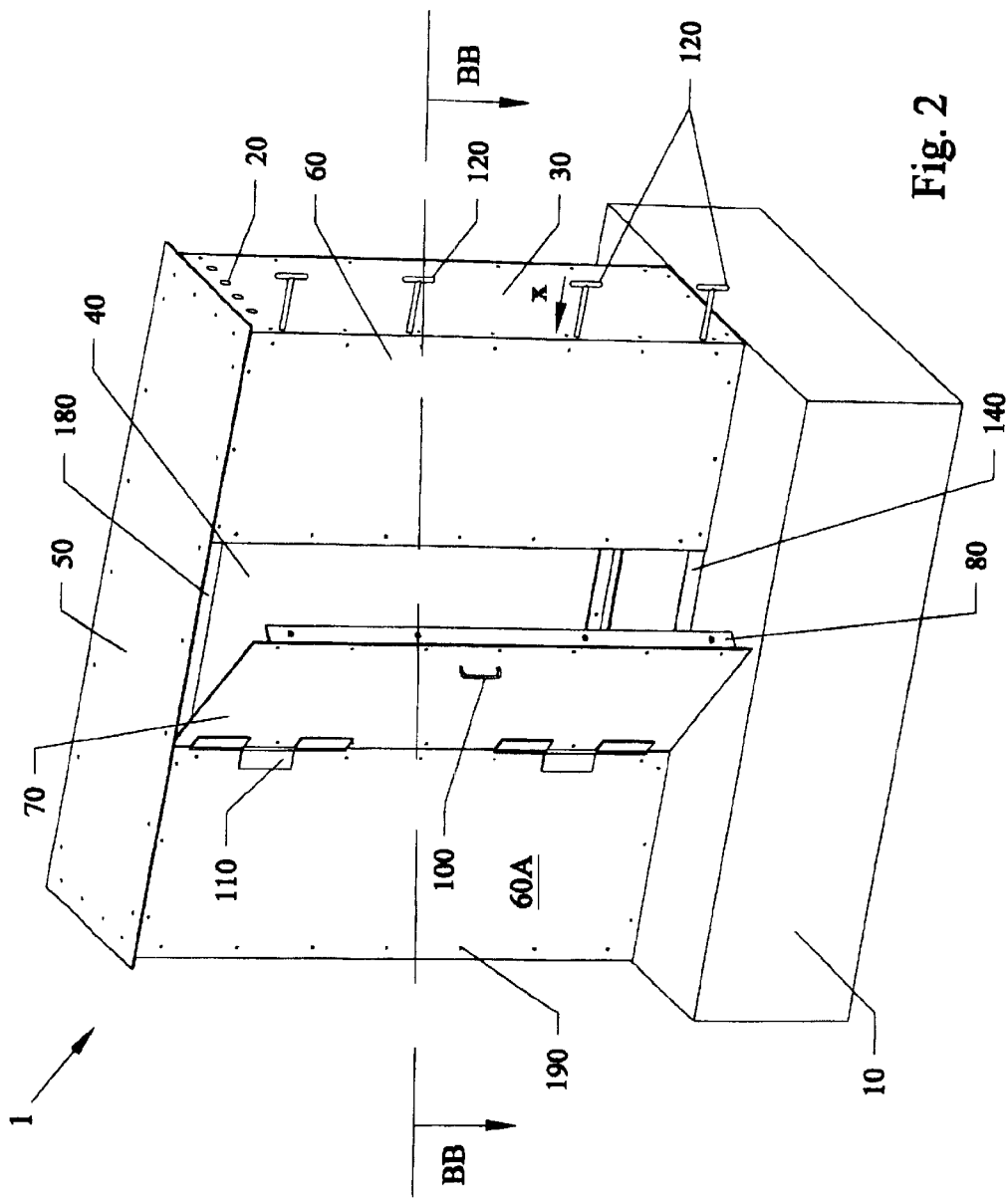
FIG. 2 is another view of the shelter of FIG. 1 with the door in an open position.

FIG. 1 is a perspective view of the relocateable shelter invention 1. FIG. 2 is another view of the shelter 1 of FIG. 1 with the door 70 in an open position. FIG. 3A is a cross-sectional view of the shelter 1 of FIG. 2 along arrow BB. Referring to FIGS. 1–3A, shelter 1 includes a concrete foundation 10 that can be rectangular shaped with dimensions of approximately 94 inches long by approximately 72 inches wide by approximately 24 inches thick. The overall shelter 1 positioned on foundation 10 can have dimensions of approximately 94 inches long by approximately 27.5 inches wide by approximately 80 inches high and be formed from materials such as carbon steel plates and components to be described in reference to the drawings.

FIG. 3A is a cross-sectional view of the shelter 1 of FIG. 2 along arrow BB. FIG. 3B is an enlarged view of a door hinge 110 and jam 170 of FIG. 3A. FIG. 3C is an enlarged view of the safe-T handle 120 of FIG. 3A. FIG. 4A is a cross-sectional view of the shelter 1 of FIG. 1 along arrow AA. FIG. 4B is an enlarged view of the door hinge 110 and jam 170 of FIG. 4A. FIG. 4C is an enlarged view of the safe-T handle 120 of FIG. 4A.

Figure 9:
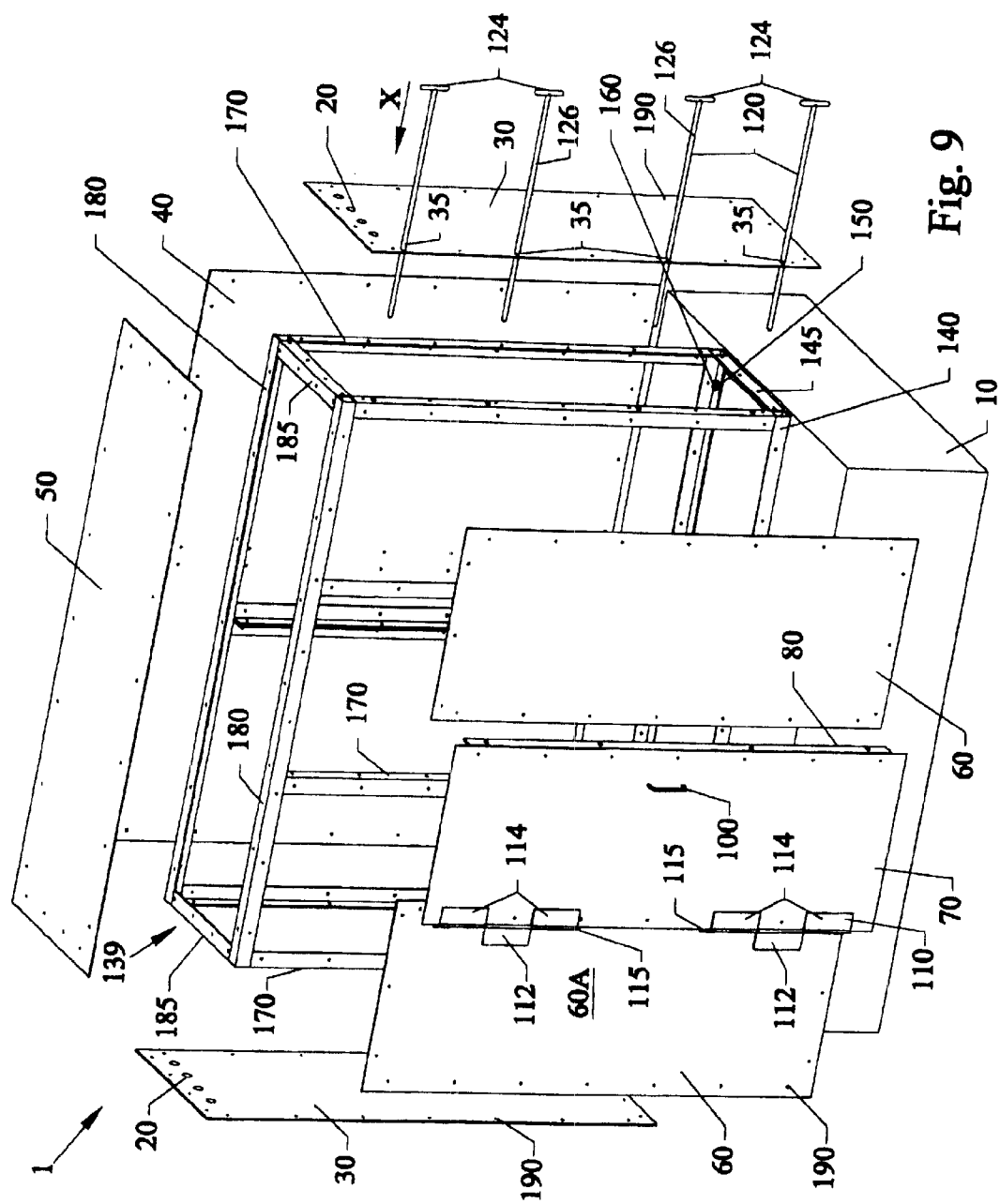
FIG. 9 is an exploded view of the shelter of FIG. 1.
Figure 10:
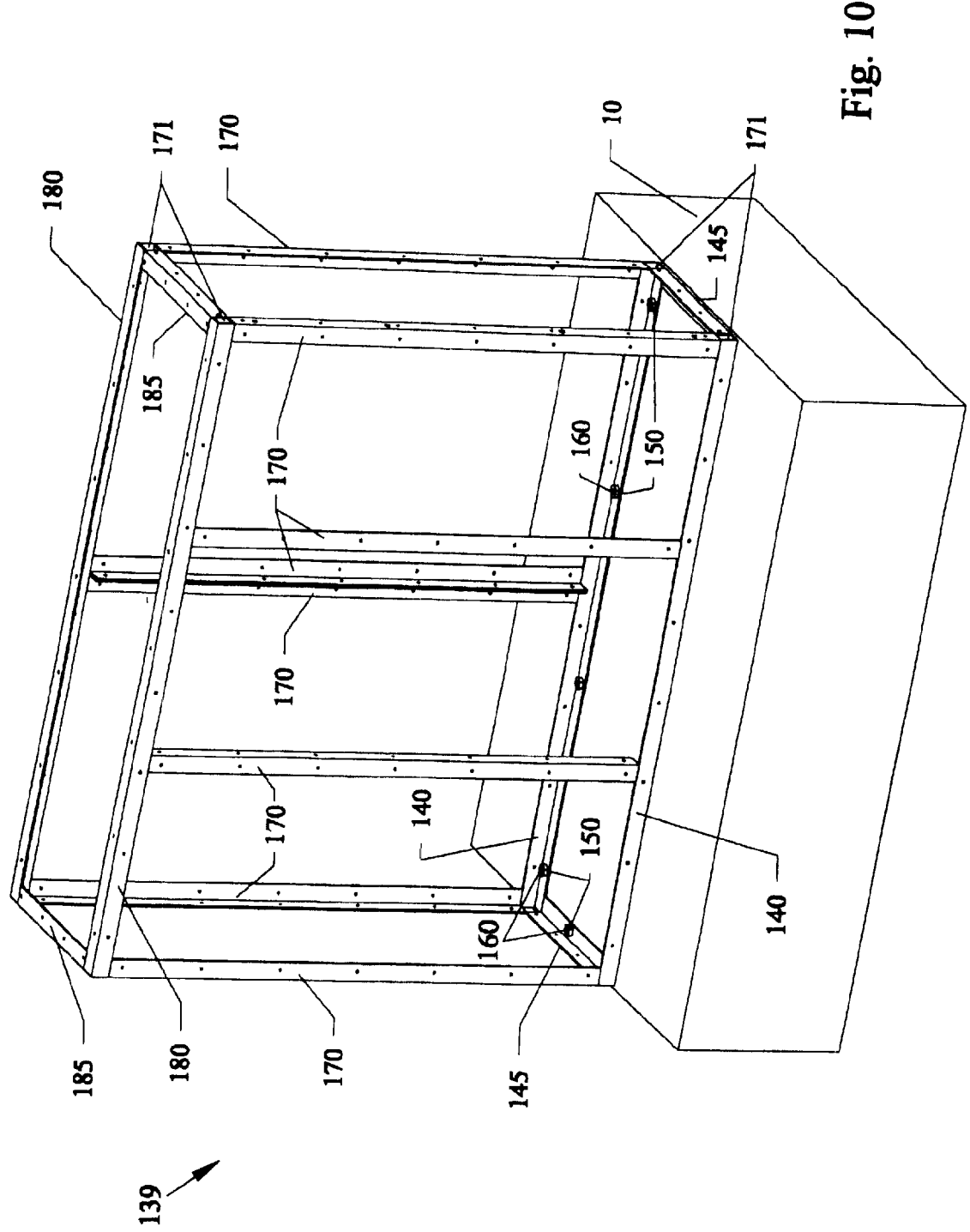
FIG. 10 is a view of the internal frame assembly of FIG. 9.

FIG. 5 is a top view of the shelter 1 of FIG. 1 along arrow C1. FIG. 6 is a front view of the shelter 1 of FIG. 1. FIG. 7 is a side view of the shelter 1 of FIG. 1 along arrow C2. FIG. 8 is another side view of the shelter 1 of FIG. 1 along arrow C3. FIG. 9 is an exploded view of the shelter 1 of FIG. 1. FIG. 10 is a view of the internal frame assembly 139 of FIG. 9.

The assembly of the shelter will now be discussed. Referring to FIG. 10, frame assembly 139 includes two beam members 140 have L cross-sectional shapes, each having lengths of approximately 94 inches long, each being held to foundation 10 by anchor bolts 150 that are threaded into foundation 10 capped by removable fasteners 160 such as hexagon nuts. Two end beam members 145 each having lengths of approximately 27.5 inches can be attached to respective ends of beam members 140 and can be similarly attached to foundation 10 by anchor bolts 150 and fasteners 160. Anchor bolts 150 can have hook bottom end inside of the foundation, and an upper threaded end to protrudes up from the surface of the foundation 10. Longitudinal beam members 140 and end beam members 145 form a rectangular base for the frame assembly 139. Vertically oriented wall frame members 170 each having L cross-sectional shapes, and each having a length of approximately 80 inches, can be attached to the corners of the rectangular base by removable fasteners 171 such as screws and nuts. Additionally, two wall frame members 170 can be positioned and attached to form both sides of a doorjamb, and two frame members 170 can be positioned side-by-side to one another to form a vertical back frame member along a backwall portion of the frame assembly 139. The upper ends of vertically oriented wall frame members 170 can be attached to rectangular top frame formed from two beam members 180 each having L cross-sectional shapes and lengths of approximately 94 inches long and end beam members 185 each having lengths of approximately 27.5 inches. Beam members 140, end beam members 145, vertical frame members 170, beam members 180 and end beam members 185 can be attached to one another with removable fasteners 171, such as but not limited to screws and nuts, so that the entire frame assembly 139 can be easily assembled and disassembled.

Referring to FIGS. 5–10, the basic structure of shelter 1 can then be assembled about frame 139 by attaching opposing end panels 30 to vertical frame members 170, and end beam members 145, 185 by threaded frame fasteners 190, such as but not limited to screws and bolts. Each of the end panels 30 can have dimensions of approximately 80 inches high by approximately 27.5 inches wide and approximately ¼ inch thick, and be formed from carbon steel plate, and include a row or ventilation through-holes 20 can be drilled or punched along the top edges. On the front of frame 139 can be two front panels 60, each being formed from approximately ¼ inch thick and fastened to vertical frame members 170 and beam members 140, 180 by additional frame fasteners 190. A door 70 can be positioned between front panels 60, and can have a thickness of approximately ¼ inch thick. The attachment of the door 70 will be described in greater detail in reference to FIGS. 3A–3C and 4A–4C. Together front panels 60 and door 70 form a front wall for the shelter having overall dimensions of approximately 94 inches long by approximately 80 inches high. A back panel 40 having overall dimensions of approximately 94 inches long by approximately 80 inches wide, and approximately ¼ inch thick can be fastened to beam members 140, 180 and vertical members 170 by removable fasteners 190. Finally a top panel 50 having overall dimensions of approximately 94 inches long by approximately 27.5 inches wide by approximately ¼ inch thick can be fastened to beam members 180 and end beam members 185 by the removable fasteners 190.

The assembly and operation of the door 70 will now be described in reference to FIGS. 1, 2, 3A–4C and 9. Door 70 can be pre-attached to left front panel 60A(60) by welding outer left flap plates 112 of each of the two hinges 110 to the exterior of the front panel 60A. Right outer flap plates 114 of hinge 110 can also be welded to exterior edges of door 70. Each of the two hinges 110 have right outer flap plates 114 that rotate relative to outer left flap plates 112 about an inner pivot pin 115 in the direction of arrows R(FIG. 3A). Flap plates 112, 114 can be formed from ¼ inch thick carbon steel plates. On the inside of the door 70 adjacent to and opposite to hinges 110 is a longitudinal L-shaped door brace plate 80 having one leg 82 welded to an inner surface edge of door 70, and a second outer leg 84 perpendicular to leg 82. A second longitudinal L-shaped door hinge guard plate 90 is welded to plate 80. Plates 80 and 90 together form a step shape. Door hinge guard plate 90 includes an outer one leg 92 welded to the outer leg 84 of door brace plate 80 and has a second leg 94 perpendicular to leg 92. When the door 70 moves from an open position, FIG. 3B, to a closed position, FIG. 4B, leg 84 abuts against interior edge 172 of vertical frame member 170 and outer second leg 94 abuts against outer edge 173 of vertical frame member 170.

Referring to FIGS. 3A, 3C, 4A, 4C, a second longitudinal door brace plate 80' is welded to the opening edge of door 70 so that leg 82' is welded to door 70 and leg 84' is perpendicular and extends to the inside of door 70. Four through-holes 85'(only one is shown here) extends through leg 84'. On the inside of right front panel 60B is a wall frame member 170 that forms a right side of a door jam and includes four through-holes 175(only one is shown here) through an interior facing leg portion 174 of frame member 170. Referring to FIG. 3C, an elongated L-shaped member bracket 130 has an inner leg 132 that can be welded to an inside plate 64 that in turn can be welded to an inside of right front panel 60B. Bracket 130 has an outer leg 134 with four through-holes 135(only one is shown) that functions as a support bracket for Safe-T handles 120. Referring to FIGS. 1, 2, 3A, 3C, 4A, 4C, and 9, four Safe-T handles 120 each having a handle end 124 outside shelter 1 has a longitudinal bar portion 126 that passes through openings 35 in end panels 30 and through through-holes 35 that are located in legs 34 of L-shaped Safe-T handle support brackets 130 and through through-holes 175 in side door jam 170 so that narrow tip end 122 can pass into and out of through-holes 85' in door brace 80' either locking door 70 in place or allowing door 70 to be opened. The four SafeT-Handles 120 permit the shelter 1 to be opened from either the inside or outside. The outside of the door 70 further includes a door handle 100 that can be C-shaped member attached thereto by welding, removable fasteners such as screws, bolts, and the like.

Although only carbon steel is referred to as a preferred material in the preferred embodiment, other materials of suitable strength can be used, such as but not limited to aluminum, fiberglass, and other suitable materials.

Once a person or family has experienced the safety of this appliance shelter invention 1, he or they may relocate as necessary and take this appliance shelter 1 with them without having the total expense of purchasing another shelter appliance. The shelter 1 can be disassembled by reversing the assembly process that is described above. The cement slab 10 can be transported to a new site for reuse. Alternatively, the user can form a new cement slab foundation 10 at a new site. Still furthermore, an installer can use the shelter without the cement foundation 10 by merely fastening the shelter frame to a floor inside of another structure and/or position the shelter to be adjoining any building, commercial or residential, manufactured home or mobile home, becoming an annex thereof, an inside residences or commercial buildings which have concrete floors.

Figure 11:
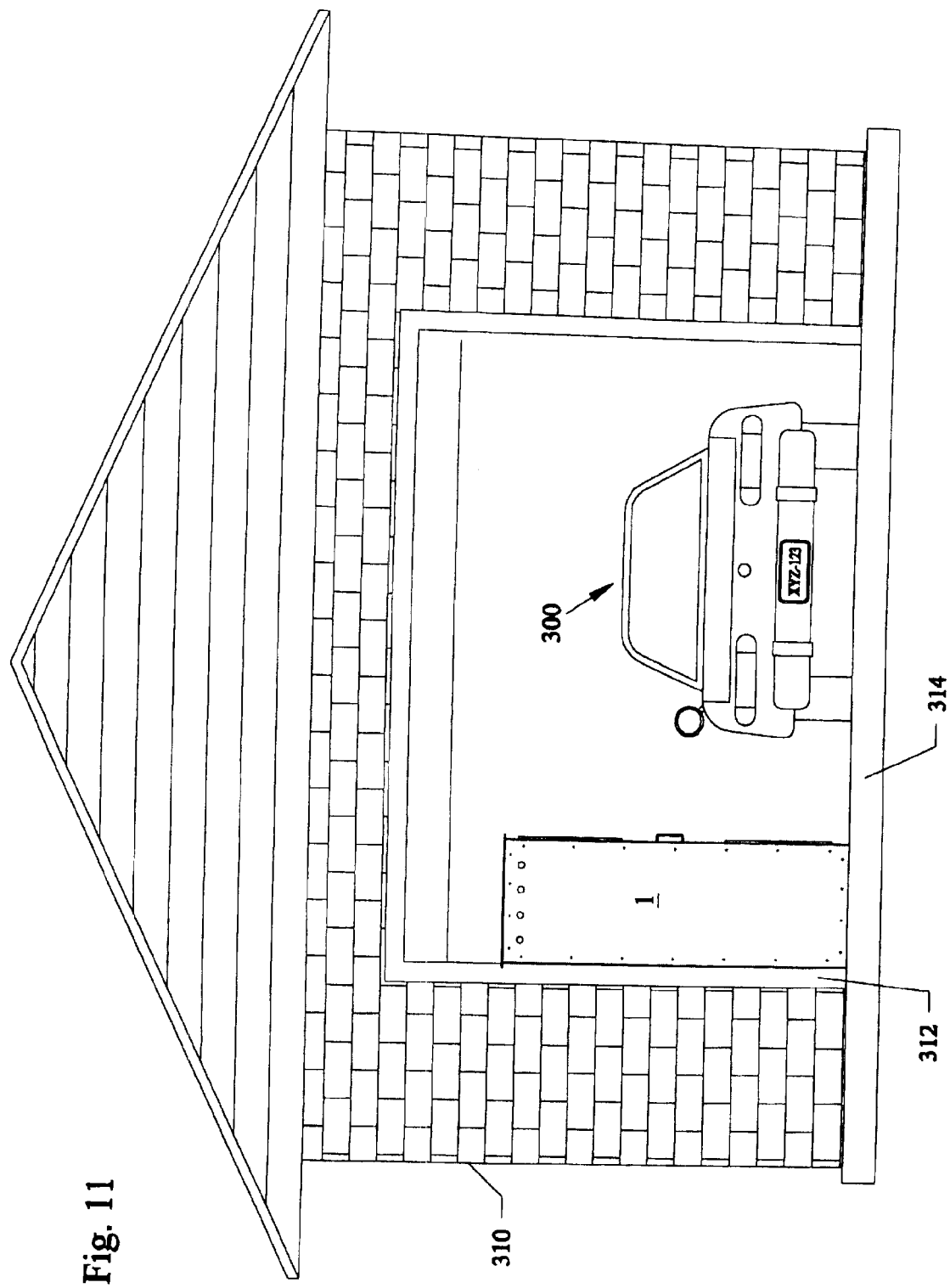
FIG. 11 is a front view of a garage using the novel shelter of the preceding figures.

FIG. 11 is a front view of a structure 310 such as a garage, and carport, where the novel shelter 1 of the preceding figures can be used inside of the structure. The shelter 1, can be used without the foundation 10, where the shelter can be leaned up against an interior wall 312, and/or fastened to either or both the wall 312 and a cement type floor 314 using the fasteners such as the anchor type bolts previously described. Clearly, the shelter 1 can be positioned so that there is plenty of room left between a vehicle 300 and the shelter 1 within the garage/carport 310. When fastening the shelter to the floor 314, plural holes can be drilled into the floor, epoxy can be poured into the holes, and threaded bolts can be inserted therein so that threaded ends are exposed in the top surface of the floor. Alternatively, an approximately twenty four inch deep hole can be cut into the floor, concrete can be poured into the hole to form a foundation, with anchor bolts inserted into the newly poured floor to become a foundation for the shelter and used as was previously described.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A relocateable shelter for protecting humans from storms, comprising in combination:

a rectangular frame formed from members that are fastened and unfastened together;

panels attached and detached about the frame to form walls and a roof to the frame;

a door attached to one of the walls of the frame for allowing access to an interior of the frame, wherein the frame, panels and door form a shelter allowing persons to seek safety within the shelter;

at least one horizontal latch means for locking and opening the door, the latch means being accessible to both outside and inside of the shelter to open the door from a closed position; and a structure chosen from at least one of a garage and a carport, the structure for housing the shelter inside, the structure being able to house at least one vehicle inside the structure, wherein the shelter and the vehicle are able to be both simultaneously located within the structure so that both the shelter and the vehicle are both simultaneously accessible by humans.

2. The relocateable shelter of claim 1, further comprising:

a rectangular concrete foundation beneath the shelter, wherein the frame is attachable and detachable from the concrete foundation.

3. The relocateable shelter of claim 1, wherein the shelter includes dimensions of:

approximately 94 inches long, by approximately 27.5 inches wide by approximately 80 inches in height, and the door positioned in one of the approximately 94 inches long walls.

4. The relocateable shelter of claim 1, wherein the frame, panels, and door are each formed from: approximately quarter inch carbon steel able to withstand winds of up to approximately 450 miles per hour.

5. The relocateable shelter of claim 1, wherein the door further includes:

hinge means for attaching the door to the shelter and for allowing the door swing out from the shelter;

hinge guard plate for bracing the door to a closed position adjacent to the hinge means so that the door will not swing into the shelter.

6. The relocateable shelter of claim 5, wherein the hinge guard includes:

a step shape.

7. The relocateable shelter of claim 6, wherein the step shape further includes:

two L-shaped plates attached to one another.

8. The relocateable shelter of claim 1, wherein each of the horizontal latch means further includes:

a horizontally oriented elongated member that having one end that slides inside of the shelter to lock the door, and having portions for allowing the door to be opened and closed.

9. The relocateable shelter of claim 1, wherein the horizontal latch means includes:

up to approximately four horizontal latch means.

10. A relocateable shelter for protecting humans from storms, comprising in combination:

a rectangular frame formed from members that are fastened and unfastened together;

panels attached and detached about the frame to form walls and a roof to the frame; and a door attached to one of the walls of the frame for allowing access to an interior of the frame, wherein the frame, panels and door form a shelter allowing persons to seek safety within the shelter, wherein the shelter is approximately 90 to approximately 100 inches long, by approximately 20 to approximately 30 inches wide by approximately 70 to approximately 100 inches in height;

at least one horizontally oriented latch means for locking and opening the door, the latch means being accessible to both outside and inside of the shelter to open the door from a closed position, and wherein the door is located in at least one wall of the approximately 90 to approximately 100 inches long, and humans are able to be safely positioned within the shelter during storms.

11. The relocateable shelter of claim 10, wherein the at least one horizontally oriented latch means includes:

at least one horizontally oriented elongated bar that having one end that slides inside of the shelter to lock the door, and an outer end having a handle for allowing the door to be opened from outside of the shelter.

12. The relocateable shelter of claim 10, wherein the shelter is located inside of a structure chosen from at least one of a garage and a carport, wherein both the shelter and a vehicle are both able to be simultaneously positioned and accessible inside of the structure.

13. A relocateable shelter for protecting humans from storms, comprising in combination:

a rectangular frame formed from members that is attachable and detachable from one another;

panels attachable and detachable about the frame to form walls and a roof to the frame; and a door attached to one of the walls of the frame for allowing access to an interior of the frame;

plural horizontally oriented elongated members for being able to slide through at least a portion of one of the walls through a portion of the door, the members for locking and unlocking the door and allowing humans to be safely protected from storms.

14. The relocateable shelter of claim 13, further comprising:

at least one hinge for attaching the door to one of the walls for allowing the door to swing outward from the shelter; and at least one step shaped hinge guard for bracing the door to a closed position adjacent to the hinge means so that the door will not swing into the shelter.

15. The relocateable shelter of claim 13, further comprising:

slots in the door and at least one wall of the shelter for allowing the horizontally oriented elongated members to slide through.

* * * * *